US 8,856,157 B2

(12) United States Patent
O'Byrne

(10) Patent No.: US 8,856,157 B2
(45) Date of Patent: Oct. 7, 2014

(54) AUTOMATIC DETECTION OF COLUMNS TO BE OBFUSCATED IN DATABASE SCHEMAS

(75) Inventor: John O'Byrne, Santa Clara, CA (US)

(73) Assignee: Business Objects Software Limited, Dublin (IE)

( * ) Notice: Subject to any disclaimer, the term of this patent is extended or adjusted under 35 U.S.C. 154(b) by 248 days.

(21) Appl. No.: 13/216,222

(22) Filed: Aug. 23, 2011

(65) Prior Publication Data

US 2013/0054650 A1 Feb. 28, 2013

(51) Int. Cl.
*G06F 17/30* (2006.01)
*G06F 21/62* (2013.01)

(52) U.S. Cl.
CPC ........ *G06F 21/6254* (2013.01); *G06F 21/6227* (2013.01)
USPC .......................................................... 707/757

(58) Field of Classification Search
CPC .......................... G06F 21/6227; G06F 21/6254
USPC .................................................. 707/692, 757
See application file for complete search history.

(56) References Cited

U.S. PATENT DOCUMENTS

| | | | | |
|---|---|---|---|---|
| 7,111,005 | B1* | 9/2006 | Wessman | 707/999.009 |
| 7,797,342 | B2* | 9/2010 | Banks et al. | 707/783 |
| 8,117,221 | B2* | 2/2012 | Elteto et al. | 707/757 |
| 8,156,159 | B2* | 4/2012 | Ebrahimi et al. | 707/804 |
| 2009/0319588 | A1* | 12/2009 | Gandhi et al. | 707/206 |
| 2010/0042583 | A1* | 2/2010 | Gervais et al. | 707/3 |
| 2010/0070518 | A1* | 3/2010 | Park et al. | 707/758 |
| 2010/0169332 | A1* | 7/2010 | Bezzi | 707/757 |

OTHER PUBLICATIONS

"Understanding and Selecting a Data Loss Prevention Solution", Securosis LLC, released Oct. 21, 2010.*
Jonathan Gennick, "Regular Expression Anti-Patterns", weblog posting dated Mar. 1, 2004, pp. 1-7.*

* cited by examiner

*Primary Examiner* — Rehana Perveen
*Assistant Examiner* — Scott A Waldron

(57) ABSTRACT

Various embodiments of systems and methods for automatic obfuscation of sensitive data in a database schema are described herein. The technique uses static detection of sensitive data by application type, static detection by column name, and data profiling by examining a sample of the tables data from the database schema.

17 Claims, 4 Drawing Sheets

AUTOMATIC DETECTION OF COLUMNS TO BE OBFUSCATED IN DATABASE SCHEMAS

FIELD

The field relates to databases. More precisely, the field relates to obfuscating (i.e., concealing meaning) sensitive data in database schemas.

BACKGROUND

In many cases, there is often a necessity to obfuscate some sensitive data in database schemas. A typical situation is within an organization, which handles databases, where there is often a development team that needs to work on a sample database. A sample database used for development and testing purposes should have the structure and joins of the original database it derives from but should lack some sensitive data. The sensitive data may be some personal data or any other kind of confidential data. For example, the sensitive data may be social security numbers, credit card numbers, personal ID numbers, etc. Usually, anonymizing such data is performed manually by investigating the database schema and marking certain columns, containing sensitive data for obfuscation. Such manual processing is very time consuming even if one knows the content of the database schema. The reason for this is that every column should be considered and the column content checked for potential sensitive data to be obfuscated.

SUMMARY

Various embodiments of systems and methods for automatic obfuscation of sensitive data in a database schema are described herein. In one embodiment, the method includes receiving a selection of the database schema and determining column obfuscation patterns within column names of the database schema. The method also includes obfuscating a first set of sensitive data from the database schema when column obfuscation patterns are determined. The method further includes determining data obfuscation patterns within rows of data of the database schema and obfuscating a second set of sensitive data from the database schema when data obfuscation patterns are determined.

In other embodiments, the system includes at least one processor for executing program code and memory, a source database with a database schema, and a repository persisting one or more standard application databases and predefined obfuscation rules corresponding to the one or more standard application databases. The system also includes a selector module to receive a selection of the database schema from the source database, a checker module to determine if the database schema is within the one or more standard application databases, and a determinator module to determine column obfuscation patterns within column names of the database schema and to determine data obfuscation patterns within rows of data of the database schema. The system further includes an obfuscator module to obfuscate a first set of sensitive data from the database schema when column obfuscation patterns are determined, obfuscate a second set of sensitive data from the database schema when data obfuscation patterns are determined, and obfuscate a third set of sensitive data from the database schema according to the predefined obfuscation rules corresponding to the one or more standard application databases when the database schema is within the one or more standard application databases.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for automatic obfuscation of sensitive data in a database schema are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
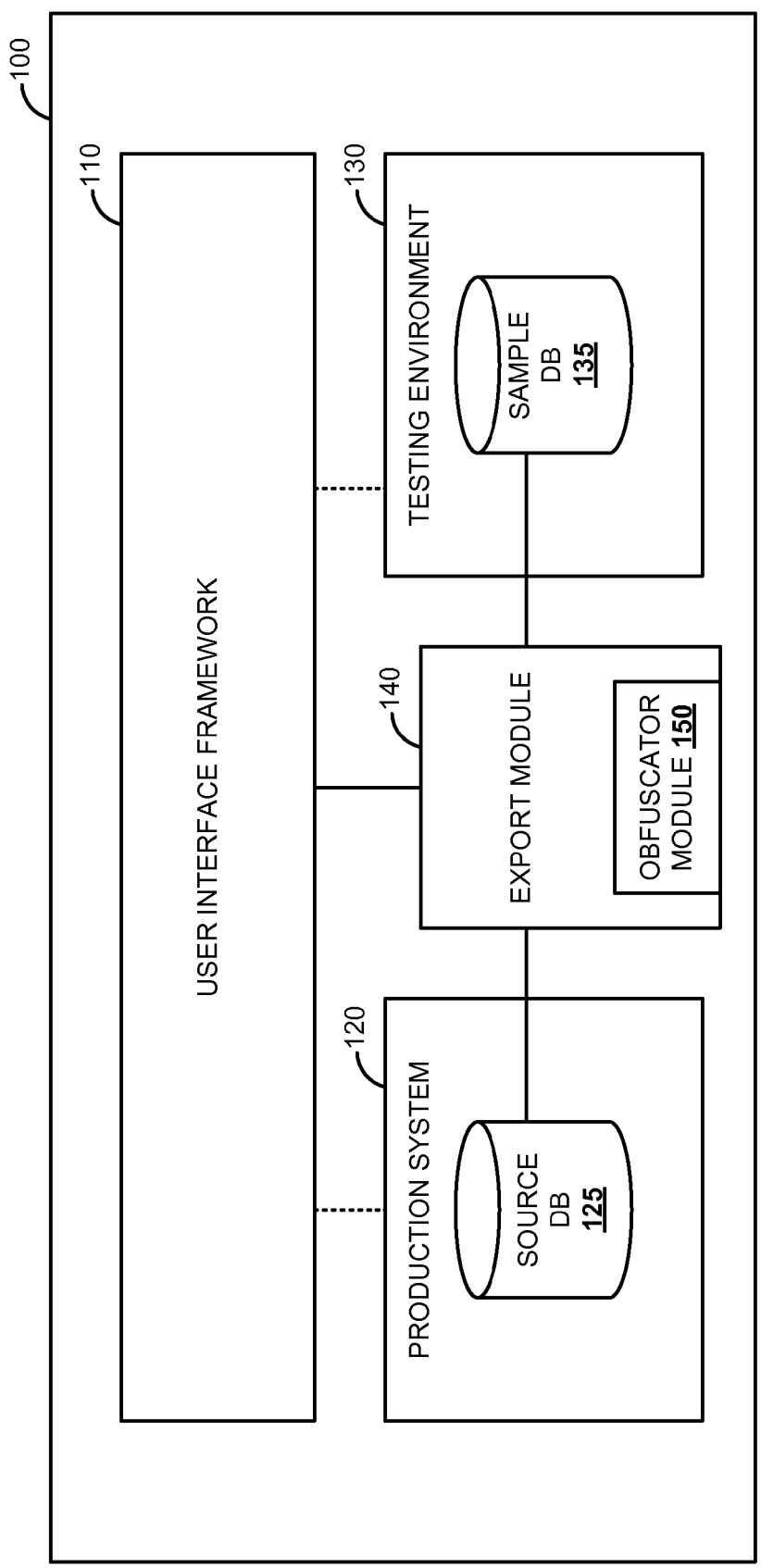
FIG. 1 is a block diagram representing an embodiment of a system for automatic obfuscation of sensitive data in a database schema.

FIG. 1 represents a block diagram of an embodiment of a system 100 for automatic obfuscation of sensitive data in a database schema. The system 100 includes a user interface framework 110. The user interface framework 110 is designed to mediate operations done on production system 120 and testing environment 130. The production system includes a source database (DB) 125. The source DB 125 comprises of data necessary for the performance of the production system 120. In some embodiments, the source DB 125 may be implemented as external to the system 100. The testing environment 130 is designed for developing and testing services. When a new computer application is being developed to run on the production system 120 and operate on data from the source DB 125, then during the development and testing process of this application, the testing environment 130 with its simplified sample DB 135 is to be used, so that the operation of the production system 120 is not affected. The transition of data from the source DB 125 to the sample DB 135 is done by export module 140. The process of transition is performed by receiving selections (queries) to the source DB, coming from the user interface framework 110 and an export module 140. After the initial selection is received, then the export module 140 is responsible for applying one or more processes, so that all related data to the already selected data from source DB 125 is transferred to the sample DB 135. Thus, the export module 140 ensures the transferred data to the sample DB 135 is consistent to the one it derived from—the source DB 125. The function of the export module 140 is to extract, transform and load the sample data to the sample DB 135 while preserving the consistency of the transferred data so that the sample DB 135 can serve as real prototype of the source DB 125 for development and testing purposes. An obfuscator module 150, which is part of the export module 140, is intended to obfuscate certain sensitive data from the source DB 125, so that the sample DB 135 does not contain sensitive data. The obfuscation is a process of cleansing any sensitive data from the sample data extracted by the export module 140 and then the cleansed sample data is transferred to the sample DB 135.

Figure 2:
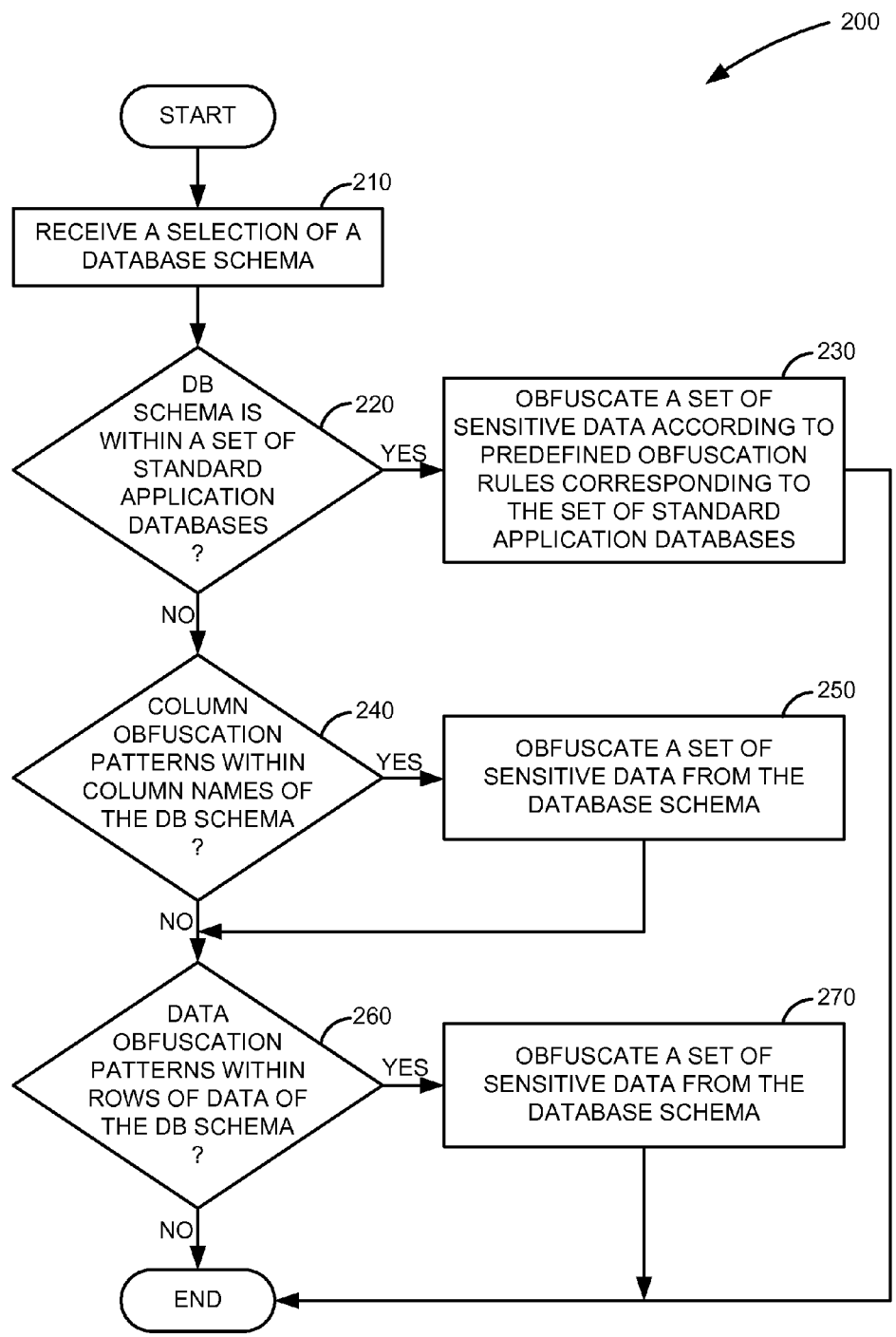
FIG. 2 is a flow diagram of an embodiment of a method for automatic obfuscation of sensitive data in a database schema.

FIG. 2 is a flow diagram of an embodiment of a method 200 for automatic obfuscation of sensitive data in a database schema. The method begins at process block 210 with receiving a selection of a database schema. Further, at decision block 220, a determination is performed if the database schema is within a set of standard application databases. Standard applications database are databases used by standard known applications such as SAP ERP® by SAP AG (Walldorf, Germany), Oracle Peoplesoft by Oracle International Corporation (Redwood Shores, US), etc. The databases used by standard known applications have known structures, and it can be predefined, which columns contain sensitive data. In one embodiment, the determination at decision block 220 is performed by determining a list of tables for the database schema and determining if the list of tables is within a predefined set of known lists.

If the database schema is within the set of standard application databases, then, at process block 230, a set of sensitive data is obfuscated from the database schema and the method ends. This set of sensitive data is obfuscated according to predefined obfuscation rules corresponding to the one or more standard application database. The predefined obfuscation rules serve for determining the sensitive data within the database schema corresponding to one of the known standard application databases. In one embodiment, the predefined obfuscation rules define columns of data from the database schema that contain sensitive data. If the database schema fails to fall within the set of standard application databases, then the method continues directly to block 240.

At decision block 240, it is determined if there are column obfuscation patterns within the column names of the database schema. Column obfuscation patterns within the column names are patterns that may define a column content to be sensitive data. For example, if the column name is "SSN", then the content is considered to be social security numbers, which is typically sensitive data, or if the column name is "CCN" then the content is credit card numbers, which is sensitive data as well. In one embodiment, determining column obfuscation patterns is performed by determining whether the database schema metadata consists of the column obfuscation patterns. The metadata may contain patterns to identify some columns to contain sensitive data.

If column obfuscation patterns are determined at decision block 240, then, at process block 250, a set of sensitive data from the database schema is obfuscated. Then the method continues at block 260. If no column obfuscation patterns are determined at decision block 240, then the method continues directly to block 260.

At decision block 260, it is determined if there are data obfuscation patterns within rows of data of the database schema. Determining data obfuscation patterns within rows of data is examining table's data for standard patterns. For example, all phone numbers may match a pattern like "nnn nnn-nnnn" or "+n nnn nnn-nnnn", or "nnnnnnnnn", where n is a digit. In one embodiment, a set of predefined recognition rules may be created to detect any matching data. In one embodiment, a predefined number of rows are determined for data obfuscation patterns within each column. The reason for that is that there may be anti-values present in a database. Anti-values are values of data having a format or content not expected for the respective type of data. Thus, pattern recognition within anti-values may be not possible, which will cause some false negatives. For more accurate data obfuscation pattern determination, more rows should be checked. In yet another embodiment, determining data obfuscation patterns within the predefined number of rows is ceased, when a data obfuscation pattern is determined within a row of a column of the schema. This saves time as the column is already detected to contain some sensitive data so it can be marked for obfuscation without determining the rest of the number of predefined rows.

If data obfuscation patterns are determined at decision block 260, then, at process block 270, a set of sensitive data from the database schema is obfuscated and the method ends. If no data obfuscation patterns are determined at decision block 260, then the method directly ends.

In one embodiment, an obfuscation score is created based on the obfuscated sets of sensitive data at blocks 230, 250, and 270. If a set of sensitive data is obfuscated at block 230, the accuracy for obfuscation is 100% as the obfuscation is based on known structures of the database schema. In that case the obfuscation score is the highest possible. The sets of sensitive data obfuscated at blocks 250 and 270 may consist of some false positives and false negatives. This means some data is obfuscated though not being sensitive and also some sensitive data remains, although it should be obfuscated. This is because the recognition rules used for determining the column obfuscation patterns and the data obfuscation patterns may not determine accurately the sensitive data in a database schema. Hence, a lower obfuscation score should be created if the obfuscation is based on the sets of sensitive data obfuscated at blocks 250 and 270.

Figure 3:
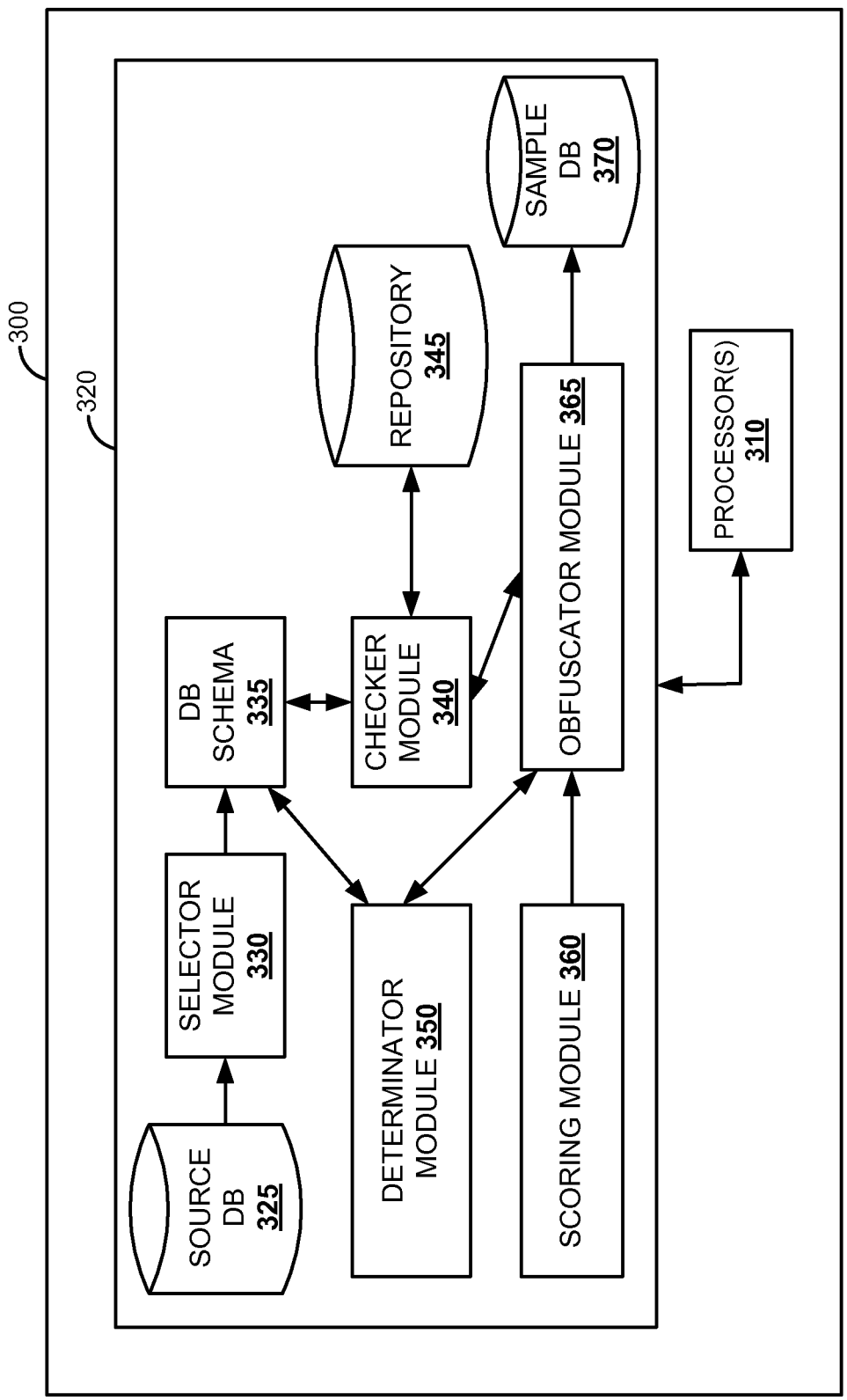
FIG. 3 is a block diagram of an embodiment of a system for automatic obfuscation of sensitive data in a database schema.

FIG. 3 is a block diagram of an embodiment of a system 300 for automatic obfuscation of sensitive data in a database schema. The system includes one or more processors 310 for executing program code. Computer memory 320 is in connection to the one or more processors 310. The system 300 further includes a source database 325 with a database schema 335 and a repository 345 persisting one or more standard application databases and predefined obfuscation rules corresponding to the one or more standard application databases. In one embodiment, the predefined obfuscation rules corresponding to the one or more standard application databases define which columns of data from the database schema contain sensitive data.

A selector module 330 receives a selection of the database schema 335 from the source database 325. A checker module 340 determines if the database schema 335 is within the one or more standard application databases persisted in the repository 345. In one embodiment, the checker module 330 determines a list of tables for the database schema and determines if the list of tables is within a predefined set of known list.

A determinator module 350 determines column obfuscation patterns within column names of the database schema 335 and determines data obfuscation patterns within rows of data of the database schema 335. In one embodiment the determinator module 350 determines whether the metadata of database schema 335 comprises the column obfuscation patterns. In another embodiment, the determinator module 350 determines data obfuscation patterns within a predefined number of rows of each column in the database schema and ceases the determination of data obfuscation patterns within a row when a data obfuscation pattern is determined.

An obfuscator module 365 is in connection with the checker module 340 and the determinator module 350. The obfuscator module 365 obfuscates a set of sensitive data from the database schema 335 according to the predefined obfuscation rules corresponding to the one or more standard application databases when the database schema is within the set of one or more standard application databases. The obfuscator module 365 also obfuscates a set of sensitive data from the database schema 335 when column obfuscation patterns are determined, and obfuscates another set of sensitive data from the database schema 335 when data obfuscation patterns are determined.

In one embodiment, the system 300 further includes a scoring module 360 to create an obfuscation score based on the obfuscated sets of sensitive data.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 4:
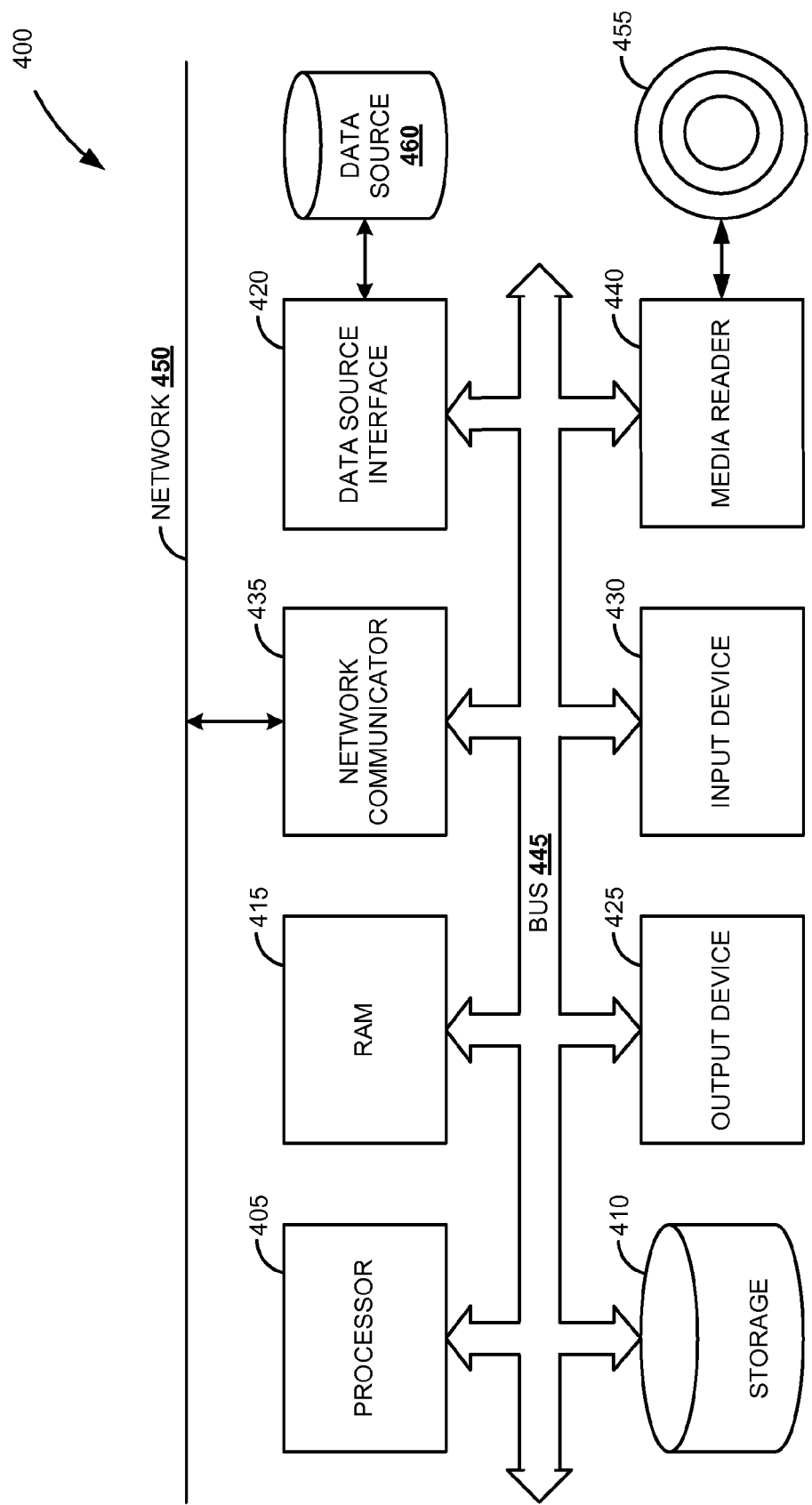
FIG. 4 is a block diagram illustrating a computing environment in which the techniques described for automatic obfuscation of sensitive data in a database schema can be implemented, according to an embodiment of the invention.

FIG. 4 is a block diagram of an exemplary computer system 400. The computer system 400 includes a processor 405 that executes software instructions or code stored on a computer readable storage medium 455 to perform the above-illustrated methods of the invention. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment of the invention, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for automatic obfuscation of sensitive data in a database schema comprising:
   receiving a selection of the database schema defining at least one table including at least one column comprising anti-values, wherein anti-values are values of data in a format or content different from expected format or content for a respective type of data;
   determining column obfuscation patterns that define column content with sensitive data by analyzing column names in metadata of the database schema;
   obfuscating a first set of sensitive data from a table of the at least one table of the database schema when the column obfuscation patterns are determined;
   determining data obfuscation patterns, within a predefined set of rows of data from rows of the table of the database schema based on a set of predefined recognition rules, to detect a column from the at least one column of the at least one table to be obfuscated, wherein the determining within the predefined set of rows of data for the column from the table is ceased when a data obfuscation pattern for the column is determined;
   obfuscating a second set of sensitive data from the table of the at least one table of the database schema when the data obfuscation patterns are determined; and
   determining an obfuscation score, defining accuracy for the obfuscation of the first set of sensitive data and the second set of sensitive data.

2. The method of claim 1 further comprising:
   determining whether the database schema is within one or more standard application databases; and
   obfuscating a third set of sensitive data from the table of the database schema according to predefined obfuscation rules corresponding to the one or more standard application databases when the database schema is within the one or more standard application databases.

3. The method of claim 2, wherein determining whether the database schema is within the one or more standard application databases further comprises:
   determining a list of tables for the database schema; and
   determining whether the list of tables is within a predefined set of known lists.

4. The method of claim 2, wherein the predefined obfuscation rules corresponding to the one or more standard application databases define which columns of data from the table of the database schema contain the sensitive data.

5. The method of claim 2, further comprising creating a second obfuscation score based on the obfuscated sets of sensitive data.

6. The method of claim 1, wherein determining the column obfuscation patterns within the column names of the database schema further comprises determining whether the database schema metadata comprises the column obfuscation patterns.

7. A computer system for automatic obfuscation of sensitive data in a database schema including at least one processor for executing program code and memory, the system comprising:
   a source database with a database schema defining at least one table including at least one column comprising anti-values, wherein anti-values are values of data in a format or content different from expected format or content for a respective type of data;
   a selector module to receive a selection of the database schema from the source database;
   a determinator module to:
      determine column obfuscation patterns that define column content with sensitive data by analyzing column names in metadata of the database schema; and
      determine data obfuscation patterns, within a predefined set of rows of data from rows of a table of the at least one table of the database schema based on a set of predefined recognition rules, to detect a column from the at least one column of the at least one table to be obfuscated, wherein the determining within the predefined set of rows of data for the column from the table is ceased when a data obfuscation pattern for the column is determined; and
   an obfuscator module to obfuscate a first set of sensitive data from the table of the database schema when the column obfuscation patterns are determined, and obfuscate a second set of sensitive data from the table of the database schema when the data obfuscation patterns are determined; and
   a scoring module to:
      create an obfuscation score, defining accuracy for the obfuscation of the first set of sensitive data and the second set of sensitive data.

8. The system of claim 7, further comprising:
   a repository persisting one or more standard application databases and predefined obfuscation rules corresponding to the one or more standard application databases, the standard obfuscation rules defining which columns of data from the table of the database schema contain the sensitive data; and
   a checker module to determine if the database schema is within the one or more standard application databases by determining a list of tables for the database schema and determining whether the list of tables is within a predefined set of known lists.

9. The system of claim 8, wherein the obfuscator module is further operable to obfuscate a third set of sensitive data from the table of the database schema according to the predefined obfuscation rules corresponding to the one or more standard application databases when the database schema is within the one or more standard application databases.

10. The system of claim 9, wherein the scoring module is further operable to create a second obfuscation score based on the obfuscated sets of sensitive data.

11. The system of claim 7, wherein the determinator module is further operable to determine whether the metadata of the database schema comprises the column obfuscation patterns.

12. An article of manufacture including a non-transitory computer readable storage medium to tangibly store instructions, which when executed by a computer, cause the computer to:
receive a selection of a database schema defining at least one table including at least one column comprising anti-values, wherein anti-values are values of data in a format or content different from expected format or content for a respective type of data;
determine column obfuscation patterns that define column content with sensitive data by analyzing column names in metadata of the database schema;
obfuscate a first set of sensitive data from a table of the at least one table of the database schema when the column obfuscation patterns are determined;
determine data obfuscation patterns, within a predefined set of rows of data from rows of the table of the database schema based on a set of predefined recognition rules, to detect a column from the at least one column of the at least one table to be obfuscated, wherein the determining within the predefined set of rows of data for a column from the table is ceased when a data obfuscation pattern for the column is determined;
obfuscate a second set of sensitive data from the table of the database schema when the data obfuscation patterns are determined; and
determine an obfuscation score, defining accuracy for the obfuscation of the first set of sensitive data and the second set of sensitive data.

13. The article of manufacture of claim 12, further comprising instructions, which when executed by a computer, cause the computer to:
determine whether the database schema is within one or more standard application databases; and
obfuscate a third set of sensitive data from the table of the database schema according to predefined obfuscation rules corresponding to the one or more standard application databases when the database schema is within the one or more standard application databases.

14. The article of manufacture of claim 13, wherein the instructions to determine whether the database schema is within the one or more standard application databases further comprise instructions, which when executed by a computer, cause the computer to:
determine a list of tables for the database schema; and
determine whether the list of tables is within a predefined set of known lists.

15. The article of manufacture of claim 13, wherein the predefined obfuscation rules corresponding to the one or more standard application databases define which columns of data from the table of the database schema contain the sensitive data.

16. The article of manufacture of claim 13, further comprising instructions to create a second obfuscation score based on the obfuscated sets of sensitive data.

17. The article of manufacture of claim 12, wherein the instructions to determine the column obfuscation patterns further comprise instructions, which when executed by a computer, cause the computer to determine whether the metadata of the database schema comprises the column obfuscation patterns.

* * * * *